(12) United States Patent
Chun

(10) Patent No.: US 8,897,773 B2
(45) Date of Patent: Nov. 25, 2014

(54) METHOD AND APPARATUS FOR UTILIZING FEMTOCELL

(75) Inventor: Young Gun Chun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 471 days.

(21) Appl. No.: 12/855,890

(22) Filed: Aug. 13, 2010

(65) Prior Publication Data

US 2011/0053592 A1 Mar. 3, 2011

(30) Foreign Application Priority Data

Aug. 28, 2009 (KR) .................. 10-2009-0080749

(51) Int. Cl.
*H04W 4/00* (2009.01)
*H04W 48/16* (2009.01)
*H04W 84/04* (2009.01)

(52) U.S. Cl.
CPC ............ *H04W 48/16* (2013.01); *H04W 84/045* (2013.01)
USPC ..... 455/434; 455/435.2; 455/450; 455/452.1; 455/566

(58) Field of Classification Search
CPC ... H04W 84/045; H04W 84/10; H04W 84/12; H04W 84/16
USPC ................ 455/432.1, 432.3, 433, 434, 435.1, 455/435.2, 435.3, 436, 444, 449, 450, 451, 455/452.1, 552.1, 566; 370/328, 329, 331
See application file for complete search history.

(56) References Cited

U.S. PATENT DOCUMENTS

| | | | |
|---|---|---|---|
| 6,665,533 B1 | 12/2003 | Sakoda | |
| 8,019,331 B2 * | 9/2011 | Khetawat et al. | 455/422.1 |
| 8,644,830 B2 | 2/2014 | Mori | |
| 2009/0052395 A1 | 2/2009 | Bao et al. | |
| 2009/0097452 A1 | 4/2009 | Gogic | |
| 2009/0221287 A1 * | 9/2009 | Balasubramanian et al. | 455/434 |
| 2010/0041364 A1 * | 2/2010 | Lott et al. | 455/404.1 |
| 2010/0056145 A1 * | 3/2010 | Hashimoto et al. | 455/435.2 |
| 2010/0120426 A1 * | 5/2010 | Singh et al. | 455/435.1 |
| 2010/0240347 A1 * | 9/2010 | Abramsky | 455/414.1 |
| 2011/0014920 A1 * | 1/2011 | Nylander et al. | 455/442 |
| 2011/0021240 A1 * | 1/2011 | Hiltunen et al. | 455/522 |
| 2012/0218958 A1 * | 8/2012 | Rangaiah | 370/329 |

FOREIGN PATENT DOCUMENTS

| | | | |
|---|---|---|---|
| CN | 101322430 A | 12/2008 | |
| JP | 2000-295170 A | 10/2000 | |
| JP | 2007-300483 A | 11/2007 | |
| JP | 2008-278264 A | 11/2008 | |
| WO | 2007/040453 A2 | 4/2007 | |
| WO | WO 2009/026036 | 2/2009 | ............... H04Q 7/20 |
| WO | 2009/049197 A2 | 4/2009 | |

OTHER PUBLICATIONS

Gogic, Aleksandar; Patent Application Publication No. US 2009/0098873 A1; Publication Date: Apr. 16, 2009; "System and Method to Locate FEMTO Cells with Passive Assistance . . . ;".

(Continued)

*Primary Examiner* — Jean Gelin
(74) *Attorney, Agent, or Firm* — Cha & Reiter, LLC

(57) ABSTRACT

A femtocell utilizing method and apparatus are disclosed. A mobile terminal may establish a communication channel to a microminiaturized base station for mobile communication creating a femtocell on the basis of a frequency, PSC information, or a frequency band or multiple frequencies. The mobile terminal employing the method and apparatus enables the user to initiate femtocell search at a desired point in time, increasing effectiveness in utilization of a femtocell.

15 Claims, 5 Drawing Sheets

(56) References Cited

OTHER PUBLICATIONS

Ericsson; "Active Mode Inbound Mobility to CSG;" $3^{rd}$ Generation Partnership Project (3GPP) Draft; Seoul, Korea; R2-092084; Mar. 2009; XP050339944.

Samsung; "Issues With UE Autonomous Search Function for Home-eNB Cells;" $3^{rd}$ Generation Partnership Project (3GPP) Draft; Seoul, Korea; R2092424; Mar. 2009; XP050340136.

* cited by examiner

METHOD AND APPARATUS FOR UTILIZING FEMTOCELL

CLAIM OF PRIORITY

This application claims the priority under 35 U.S.C. §119(a) of an application entitled "Method And Apparatus For Utilizing Femtocell" filed in the Korean Intellectual Property Office on Aug. 28, 2009 and assigned Serial No. 10-2009-0080749, the contents of which are hereby incorporated by reference.

BACKGROUND OF THE INVENTION

1. Field of the Invention

The present invention relates generally to a femtocell and, more particularly, to a method and apparatus that provide a mechanism for enabling a user to initiate femtocell search at a desired point in time.

2. Description of the Related Art

With rapid advances in technology, early mobile terminals supporting only voice calls and short messaging have evolved into supporting various new functions, such as video calls, electronic scheduling, digital camera, the Internet. The user of a mobile terminal can now readily capture and store still images and moving images, and transmit the captured images to another mobile terminal.

In communication coverage areas, base stations are strategically arranged to support communication between terminals, and their coverage areas partially overlap to achieve a seamless service. However, a shadow area in which a communication service is not available can occur, for example, when a mobile terminal is located in a particular region such as the inside of a building or a canyon. In such area, base stations may be unable to locate the mobile terminal, thus unable to deliver the communication service to the mobile terminal.

Accordingly, there is a need to develop a method that enables a mobile terminal to search for, at a desired time point, a communication network from which the mobile terminal is to receive a communication service.

SUMMARY OF THE INVENTION

The present invention has been made in view of the above problems and provides additional advantages, by providing a method and apparatus that enable a mobile terminal to search for a femtocell at a desired point in time.

In accordance with an exemplary embodiment of the present invention, a method used in a femtocell includes: receiving an input signal for femtocell search; upon receipt of the input signal, retrieving search setting data; determining whether a femtocell is present based on the search setting data; and attempting, when a femtocell is present, to register with the femtocell.

In accordance with another exemplary embodiment of the present invention, there is provided an apparatus used in a femtocell includes: an input unit generating an input signal for requesting a femtocell search; a storage unit storing a search setting data corresponding to the femtocell search; a control unit controlling an operation to obtain, upon receipt of the input signal, the search setting data, to determine whether a femtocell is present based on the search setting data, and to register with the femtocell when its presence is confirmed.

In a feature of the present invention, a mobile terminal may be able to efficiently search for a femtocell at a desired point in time, thus increasing convenience in utilization of a communication service and maintaining a call connection in the shadow area.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

The mobile terminal of the present invention may support various communication schemes, including and not limited to, UMTS, GSM, GPRS, CDMA, and WCDMA to provide a communication service. To achieve this, the mobile terminal may include a communication module supporting one of the communication schemes.

In the specification, a femtocell refers to a small cell defined by a microminiaturized base station for mobile communication. To be more specific, wireless communication may result in a shadow area. To remove or minimize a drop call in the shadow area, the transmit power of a base station is typically increased. However, as radio signals still may be unable to reach some shadow areas, increasing the transmit power may be not an effective solution to the problem. Hence, to eliminate problems associated with a shadow area in mobile communication, an indoor microminiaturized base station connected to a mobile communication network and Internet network is installed in a home or office. This configuration enables wired/wireless convergence services. That is, a femtocell refers to a cell that is created by a microminiaturized base station to remove a shadow area in mobile communication. Next, a description is given of a method and apparatus for utilizing a femtocell.

Figure 1:
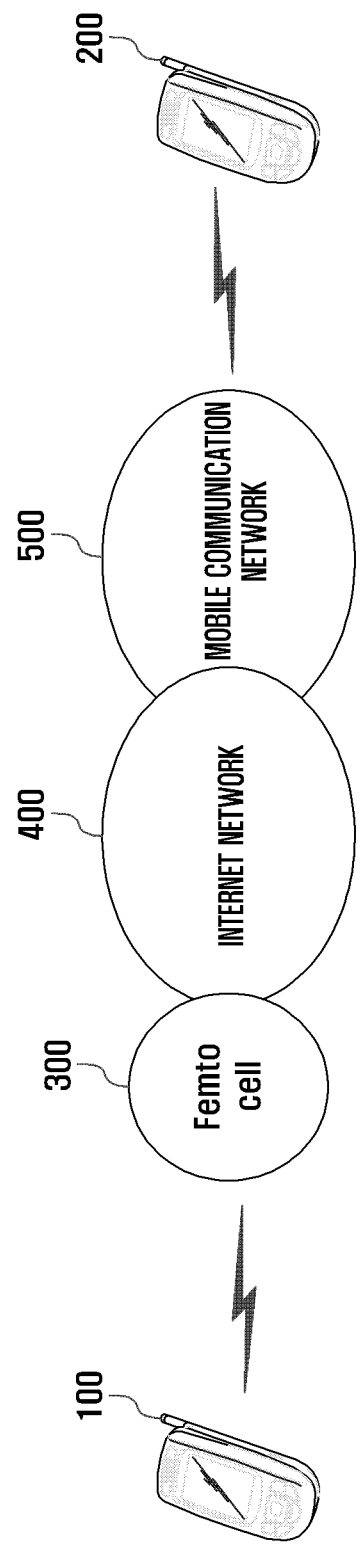
FIG. 1 illustrates a communication network system including a femtocell.

FIG. 1 illustrates an overall communication system including a femtocell. Referring to FIG. 1, the system may include a first mobile terminal 100 supporting mobile communication, a femtocell 300 located and registered by the first mobile terminal 100, an Internet network 400 and a mobile communication network 500 that are connected to the femtocell 300, and a second mobile terminal 200 communicating with the first mobile terminal 100. It should be noted that the mobile communication network 500 and the second mobile terminal 200 may be changed according to the type of a service being used by the first mobile terminal 100. For example, when the first mobile terminal 100 uses a Web service, the mobile communication network 500 and the second mobile terminal 200 may be replaced by a specific server connected to the Internet network 400.

In the system having the above-described configuration, the first mobile terminal 100 searches for the femtocell 300 in response to a request made by the user, and attempts, if successful, to register with the femtocell 300 in order to extend a mobile communication service. Here, for signal exchanges between the Internet network 400 and the first mobile terminal 100, the femtocell 300 may include a mobile communication interface for communicating with the first mobile terminal 100 and an Internet connection interface for communicating with the Internet network 400. Hence, the first mobile terminal 100 may communicate with the second mobile terminal 200 through the femtocell 300, Internet network 400, and mobile communication network 500. Next, a description is given of the configuration of the first mobile terminal 100.

Figure 2:
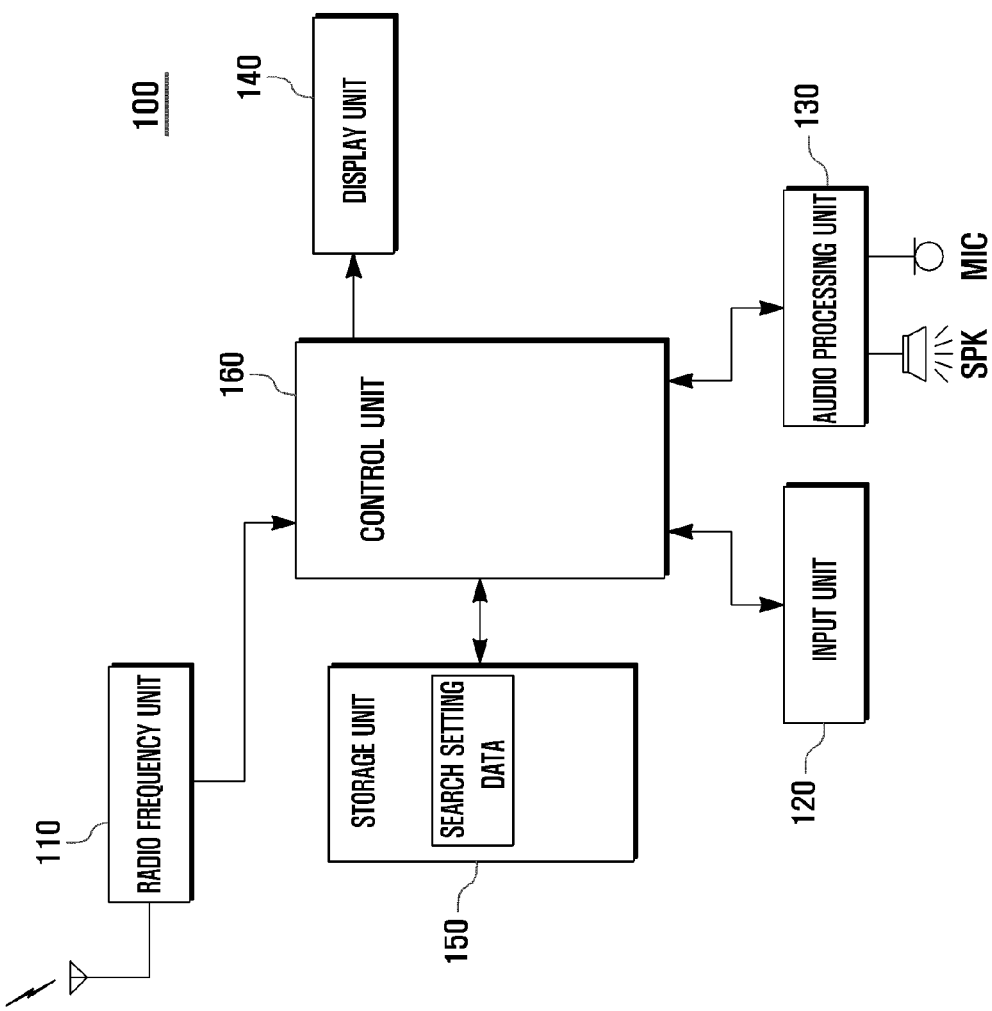
FIG. 2 is a block diagram of a mobile terminal according to an exemplary embodiment of the present invention.

FIG. 2 is a block diagram of the first mobile terminal 100 according to an exemplary embodiment of the present invention.

Referring to FIG. 2, the first mobile terminal 100 may include a radio frequency unit 110, an input unit 120, an audio processing unit 130, a display unit 140, a storage unit 150, and a control unit 160.

The first mobile terminal 100 having the above-described configuration operates the radio frequency unit 110 according to an input signal from the input unit 120. In particular, when an input signal for a femtocell search is requested, the first mobile terminal 100 retrieves a search setting data from the storage unit 150 to operate the radio frequency unit 110 to output a signal for the femtocell search over the air. When a femtocell 300 is found, the first mobile terminal 100 sends a registration request signal to the femtocell 300. If registration is successful, the first mobile terminal 100 notifies the user of registration completion and may provide a mobile communication service based on the femtocell 300. Next, a more detailed description is given of functions and roles of the components in the first mobile terminal 100.

The radio frequency unit 110 sends and receives video call data under the control of the control unit 160. The radio frequency unit 110 may include a radio frequency transmitter for upconverting the frequency of a signal to be transmitted and amplifying the signal, and a radio frequency receiver for low-noise amplifying a received signal and downconverting the frequency of the received signal. In particular, the radio frequency unit 110 may establish a communication channel to the femtocell 300 according to an input signal from the input unit 120, and send and receive signals for a mobile communication service through the established channel. The radio frequency unit 110 may establish a communication channel directly to the mobile communication network 500, and communicate with another mobile terminal through the established channel. Further, the radio frequency unit 110 may establish a communication channel to the Internet network 400 connected to the mobile communication network 500.

The input unit 120 includes a plurality of alphanumeric and function keys for inputting alphanumeric information and for setting various functions. The function keys may include direction, side, and shortcut keys associated with specific functions. The input unit 120 generates a key signal for user settings and function control and sends the generated key signal to the control unit 160. In particular, according to a user request, the input unit 120 may generate an input signal for a femtocell search, an input signal for initiating communication with another mobile terminal, and an input signal for accessing a specific server connected to the Internet network 400. The generated input signal may be sent to the control unit 160.

The audio processing unit 130 includes a speaker SPK for reproducing audio data exchanges during a video call, and a microphone MIC for collecting an audio signal, such as a voice signal of the user during the video call. In particular, the audio processing unit 130 may output a preset audio signal when the femtocell search is successful or registration with the femtocell is completed. That is, the audio processing unit 130 may output a sound alert indicating success of the femtocell search or indicting a registration completion with the found femtocell. Alternatively, the output of a sound alert may be deactivated according to user settings. For example, when the first mobile terminal 100 is set to silent or mute mode, the audio processing unit 130 may not output a separate sound alert even if such an event occurs.

The display unit 140 outputs various screens related to utilization of the first mobile terminal 100. For example, the display unit 140 may output a preset idle screen after booting, a menu screen enabling a selection of various functions, a screen enabling a selection of sub menus, and a screen related to a selection of a menu item and activation of a function. The display unit 140 may be realized using liquid crystal display (LCD) technology, and may include an LCD controller, a memory for storing data and LCD devices. When the display unit 140 has a touch screen capability, it may act as an input means. In particular, the display unit 140 may output a screen notifying the user of an attempt for femtocell search, a screen notifying success of femtocell search, a screen indicating an attempt to register with a femtocell, a screen notifying the user of completion of femtocell registration, and a screen notifying the failure of femtocell registration. The display unit 140 may output a menu enabling the user to activate a femtocell search, and, when the user activates the femtocell search by selecting the menu, output a setting data used for the femtocell search. For example, the display unit 140 may output a search setting data including a preset frequency, code, and frequency band for conducting the femtocell search. The menu screen of the display unit 140 is described later with reference to the drawings.

The storage unit 150 stores application programs related to functions of the present invention, and application programs for supporting communication services. The storage unit 150 may include a program area and a data area.

The program area stores an operating system (OS) for booting the first mobile terminal 100, stores application programs related to various optional functions such as file playback, still and moving image playback, image search, broadcast reception and image capture, and stores application programs for supporting communication. To support these functions, the first mobile terminal 100 may further include a broadcast reception module, a camera module, and the like. In particular, the application program for supporting communication may control an operation for conducting a femtocell search according to an input signal from the input unit 120, for attempting, when the femtocell search is successful, to register with the found femtocell, and for providing, when registration with the femtocell is completed, a communication service through the registered femtocell. In addition, the application program for supporting communication may control an operation for conducting search for a base station belonging to the mobile communication network 500 according to an input signal from the input unit 120 or by default, for attempting, when base station search is successful, to register with the found base station, and for providing, when registration with the base station is successful, a communication service through the registered base station.

When the first mobile terminal 100 goes out of the coverage area of the femtocell and is deregistered from the femtocell while proving a communication service through the femtocell, the application program for supporting communication may control an operation for conducting base station search and registration to automatically access the mobile communication network 500. When the first mobile terminal 100 is turned on and initialized, the application program for supporting communication is loaded on the control unit 160 and may control an operation for accessing the mobile communication network 500 according to a preset schedule or for accessing the femtocell 300 according to an input signal from the input unit 120.

The data area is an area that stores data generated by the use of the first mobile terminal 100, and may store call related data, recorded or captured data, and data related to optional functions such as phonebook data, audio data, content data and metadata. In particular, the data area stores search setting data. The search setting data is used for femtocell search, and may include the frequency of a femtocell, a primary scrambling code (PSC) of a femtocell, a frequency band for femtocell search, and multiple frequencies for femtocell search.

When subscribing to a femtocell service, the first mobile terminal 100 receives such search setting data from the corresponding service provider. That is, when the first mobile terminal 100 subscribes to a femtocell service, the service provider may send the search setting data directly or through the Internet network 400 or mobile communication network 500 to the first mobile terminal 100, which then in turn stores the received search setting data in the data area. Here, items of the search setting data may be determined according to the femtocell service usage pattern. For example, when the first mobile terminal 100 subscribes to a femtocell service that is limited only to a femtocell at a given site, the service provider may provide at least one of the frequency and PSC of the femtocell. In this case, when there are multiple femtocells at the given site, the service provider may provide multiple frequencies or a frequency band including multiple frequencies assigned to the femtocells.

When the first mobile terminal 100 subscribes to a femtocell service that is open to femtocells at multiple sites, the service provider may provide multiple frequencies assigned to the femtocells at multiple sites or a frequency band including all frequencies assigned to the femtocells.

The control unit 160 controls of the power supply to the components of the first mobile terminal 100, and controls signal exchanges between the components so that various functions thereof are properly performed. In particular, the control unit 160 conducts the femtocell search using search setting data stored in the data area according to a user request, and cause, when femtocell search is successful, registration with the found femtocell using an obtained frequency from the retrieved search setting data. When the first mobile terminal 100 goes out of the coverage area of the femtocell 300 after the establishment of a communication channel to the femtocell 300, the control unit 160 may cause a new establishment of a communication channel to the mobile communication network 500 and cause release of the communication channel from the femtocell 300. In this case, the control unit 160 may output a message indicating release of the communication channel to the femtocell 300, and output of a popup window requesting approval of transition from the femtocell 300 to the mobile communication network 500. When it is necessary to release a communication channel to the femtocell 300 and establish a communication channel to the mobile communication network 500, the control unit 160 may output of a channel establishment message without output of a channel release message. Operations of the control unit 160 related to femtocell search are described later.

Figure 3:
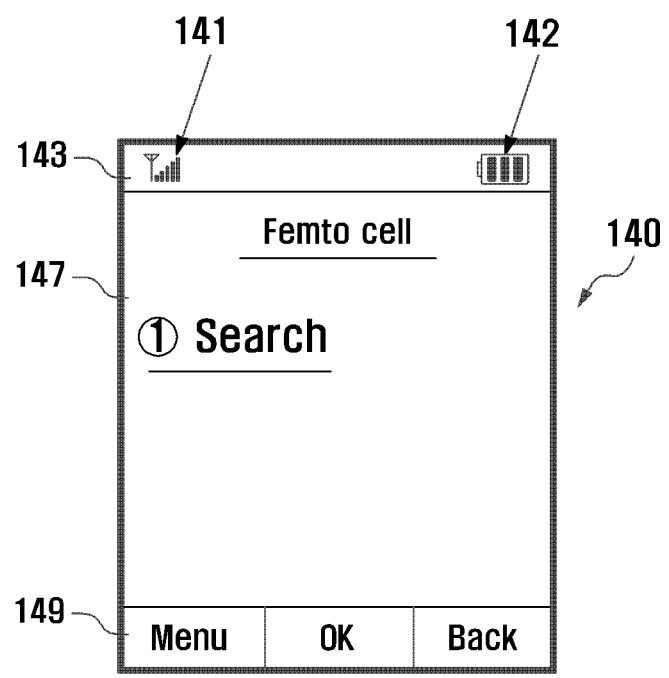
FIG. 3 illustrates a screen representation of the mobile terminal.

FIG. 3 illustrates a screen representation provided for femtocell search in the first mobile terminal. In the following description, it is assumed that the first mobile terminal 100 has established a communication channel to the mobile communication network 500 through the radio frequency unit 110. It is also assumed that the user has selected a femtocell search menu when conducting a femtocell search.

Referring to FIG. 3, the display unit 140 includes an indicator zone 143 for indicating the state of a communication channel to the femtocell 300 or to the mobile communication network 500, a femtocell menu zone 147 related to femtocell menu selection, and a soft key zone 149.

The indicator zone 143 may include a first antenna icon 141 indicating the level of a reception signal of the communication channel to the mobile communication network 500, and a battery capacity icon 142 indicating the remaining battery capacity of the first mobile terminal 100. The first antenna icon 141 may change its shape according to the current level of the reception signal from the mobile communication network 500. The battery power icon 142 may change its shape according to a change in the remaining battery capacity. When a communication channel to the femtocell 300 is established, a femtocell antenna icon similar to the first antenna icon 141 may be displayed in the indicator zone 143. The femtocell antenna icon indicating the level of a reception signal from the femtocell 300 may be displayed at a position different from or identical to that of the first antenna icon 141. When the communication channel to the mobile communication network 500 is released and a communication channel to the femtocell 300 is established, the first mobile terminal 100 may use the first antenna icon 141 as the femtocell antenna icon indicating the level of a reception signal from the femtocell 300.

The femtocell menu zone 147 may include a title field displaying a menu title like "Femtocell", and a menu item field displaying menu items of the femtocell menu. In FIG. 3, a menu item "search" is displayed alone. However, other menu items may be added according to a terminal designer/manufacturer. For example, the first mobile terminal 100 may output search setting data items such as "search based on frequency", "search based on frequency band", "search based on frequency and PSC" and "search based on frequency band and PSC" in the menu item field of the femtocell menu zone 147.

As described above, the user may initiate femtocell search at a desired time point by selecting an item of the femtocell menu though the input unit regardless of the signal level of a reception signal from the mobile communication network 500.

Hereinabove, a description of configurations of the system, mobile terminal, and screen interface for femtocell search is provided. Next, a description of a femtocell utilizing method is provided with reference to the drawings.

Figure 4:
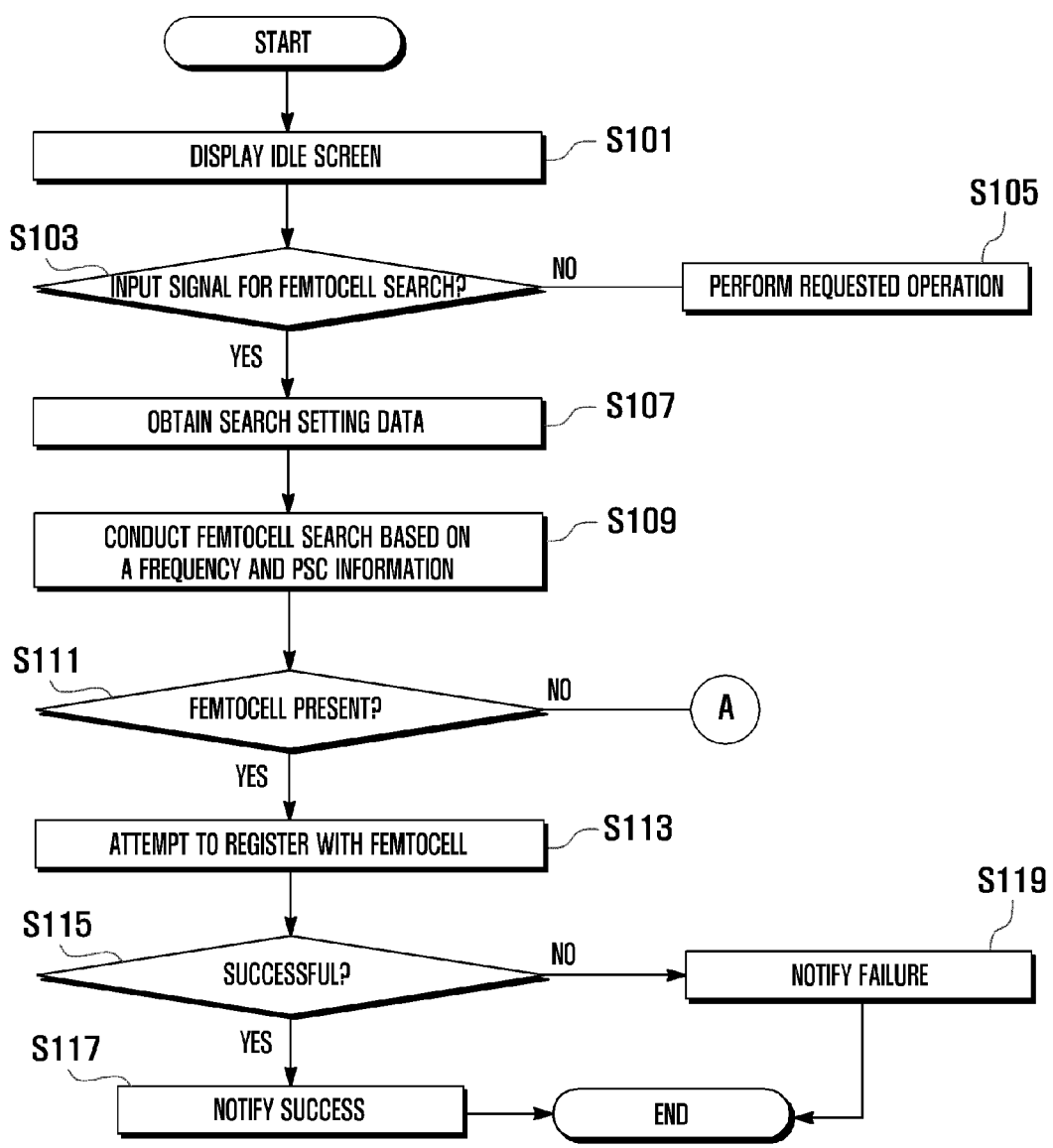
FIG. 4 is a flow chart of a femtocell utilizing method according to another exemplary embodiment of the present invention.

FIG. 4 is a flow chart of a femtocell utilizing method according to another exemplary embodiment of the present invention. In FIG. 4, femtocell search is based on a given frequency and PSC.

Referring to FIGS. 1, 2 and 4, in the femtocell utilizing method, when the first mobile terminal 100 is turned on, the control unit 160 initializes the components thereof and performs a boot procedure. After booting, the first mobile terminal 100 displays a preset idle screen on the display unit 140 (S101).

The first mobile terminal 100 checks whether an input signal is a request for conducting a femtocell search (S103). That is, when the user selects a menu item associated with the femtocell search in a displayed femtocell search menu screen, the first mobile terminal 100 prepares for the femtocell search. When the input signal is not such a request, the first mobile terminal 100 performs an operation indicated by the input signal (S105). For example, the first mobile terminal 100 may perform a user function related to file playback, file search, broadcast reception, or image capture according to the input signal.

When the input signal is a request for femtocell search, the first mobile terminal 100 refers to the search setting data (S107). To achieve this, the first mobile terminal 100 may identify the location of the search setting data in the storage unit 150, and read the search setting data. The search setting data may include frequency and PSC information for femtocell search in mobile communication. That is, the search setting data may include at least one of a frequency assigned to a microminiaturized base station managing a femtocell, a PSC assigned to a microminiaturized base station, a plurality of frequencies assigned to multiple microminiaturized base stations, and a frequency band assigned to multiple microminiaturized base stations.

The first mobile terminal 100 conducts the femtocell search on the basis of a given frequency and PSC information (S109). To search for a microminiaturized base station using the frequency, the first mobile terminal 100 transmits a signal of the frequency carrying a preset value over the air. Here, the preset signal value includes the PSC information. When a microminiaturized base station for mobile communication using the frequency and PSC information is present in the vicinity, the first mobile terminal 100 may be able to receive a corresponding response from the microminiaturized base station.

The first mobile terminal 100 checks whether a femtocell is present in the vicinity thereof (S111). Here, the first mobile terminal 100 may check the presence of a response to the femtocell search signal. When a response is received from a microminiaturized base station, the first mobile terminal 100 attempts to register with the found femtocell (S113). Registration with the femtocell may be performed in a manner similar to accessing the mobile communication network. That is, the first mobile terminal 100 may send identification information to the microminiaturized base station according to the communication scheme of the microminiaturized base station, and receive a preset signal at regular intervals from the microminiaturized base station. The first mobile terminal 100 checks whether a femtocell registration is successful (S115). When the femtocell registration is successful, the first mobile terminal 100 outputs a notification indicating the registration completion to the audio processing unit 130 or display unit 140 (S117). After the registration, the first mobile terminal 100 may establish a communication channel to the registered femtocell for a mobile communication service. When the femtocell registration fails, the first mobile terminal 100 outputs a notification indicating failure of femtocell registration to one of the audio processing unit 130 and the display unit 140 (S119).

When a femtocell is not found in the vicinity at step S111, the first mobile terminal 100 newly performs another femtocell search according to the search setting data (step 'A'). The operation at step 'A' is described later in connection with FIG. 5. At step S119 after the femtocell registration fails, the first mobile terminal 100 may return to step S113 for registration retry. This registration retry may be repeated a preset number of times or be repeated according to an input signal from the user. To overcome registration failure, the first mobile terminal 100 may proceed to step 'A' and reattempt femtocell search with another item of the search setting data. That is, the first mobile terminal 100 may notify the registration failure and output a popup window requesting that the user decide whether to retry to conduct another femtocell search and registration based on a different frequency, and, when the user accepts the retry request, proceed to step 'A'. Alternatively, the first mobile terminal 100 may output a help message describing the reason for registration failure. For example, the first mobile terminal 100 may output a message indicating that the user is not a valid subscriber or that the femtocell does not support the requested service.

Figure 5:
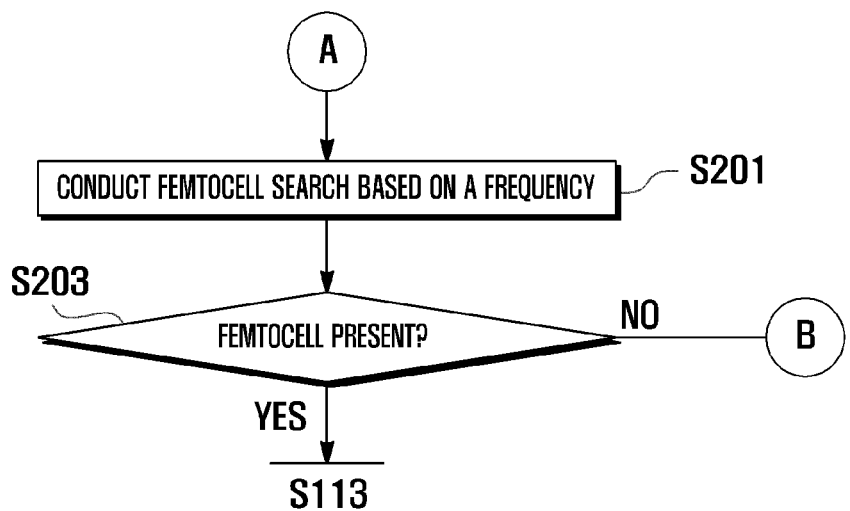
FIG. 5 is a flow chart illustrating a femtocell search procedure in the method of FIG. 4.

FIG. 5 is a flow chart illustrating a femtocell search procedure in the method of FIG. 4.

Referring to FIGS. 1, 2 and 5, when a femtocell is not found at step S111 of FIG. 4, the first mobile terminal 100 conducts a femtocell search based on a specific frequency (S201). In other words, the first mobile terminal 100 conducts a procedure to find a microminiaturized base station using the frequency, specified in the search setting data, without PSC information. The first mobile terminal 100 transmits a signal of the frequency carrying a preset value over the air, and waits for a response.

The first mobile terminal 100 checks whether a femtocell is present in the vicinity (S203). Here, the first mobile terminal 100 may check the presence of a corresponding response from a microminiaturized base station forming a femtocell. When a femtocell is present in the vicinity, the first mobile terminal 100 proceeds to step S113 of FIG. 4 and performs subsequent steps.

When a femtocell is not present (i.e., no response to the femtocell search signal), the first mobile terminal 100 proceeds to step 'B'. The operation at step 'B' is described with reference to FIG. 6.

Figure 6:
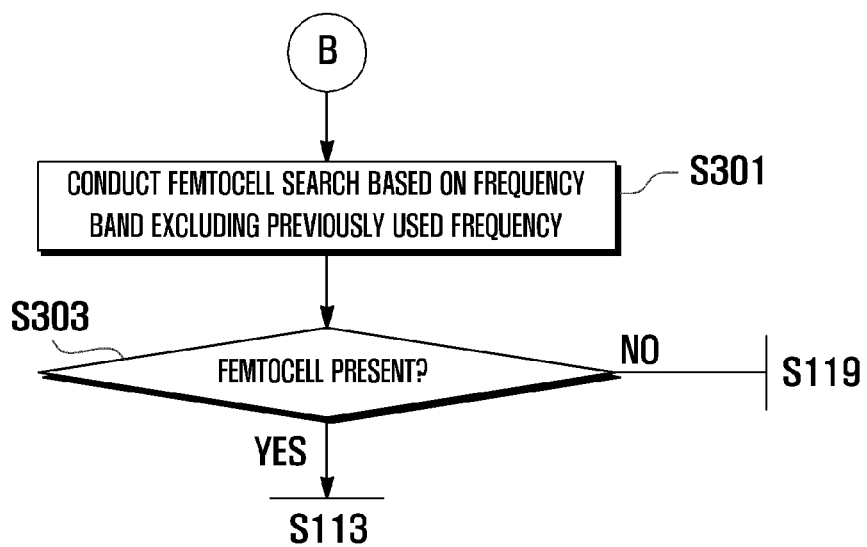
FIG. 6 is a flow chart illustrating another femtocell search procedure in the method of FIG. 4.

FIG. 6 is a flow chart illustrating another femtocell search procedure in the method of FIG. 4.

Referring to FIGS. 1, 2 and 6, when a femtocell is not found at step S203 of FIG. 5, the first mobile terminal 100 conducts another femtocell search based on a frequency band or multiple frequencies excluding the previously used frequency (S301). The first mobile terminal 100 may use a frequency band and multiple frequencies specified in the search setting data stored in the storage unit 150. Here, the frequency used at step S201 of FIG. 5 is excluded from the frequency band and multiple frequencies. The first mobile terminal 100 transmits a search signal using the frequency band or the multiple frequencies, and waits for a response.

The first mobile terminal 100 checks whether a femtocell is present in the vicinity (S303). When a femtocell is not present (i.e., no response to the femtocell search signal), the first mobile terminal 100 proceeds to step S119 of FIG. 4 for notification of femtocell search failure. At step S119, in addition to notification of femtocell search failure, the first mobile terminal 100 may output the history of femtocell search. For example, the first mobile terminal 100 may output, through the audio processing unit 130 or display unit 140, a notification indicating failure of femtocell search based on a frequency and PSC information, failure of femtocell search based on a frequency, and failure of femtocell search based on a frequency band or multiple frequencies. The first mobile terminal 100 may output a notification indicating only the most recent failure of femtocell search based on a frequency band or multiple frequencies.

When a femtocell is present in the vicinity, the first mobile terminal 100 proceeds to step S113 of FIG. 4 and performs subsequent steps.

In the above description, PSC information is used for femtocell search only in connection with a specific frequency. However, the PSC information may be used in other cases according to search procedure design. For example, the PSC information may be used in connection with a frequency band or multiple frequencies in FIG. 6. Here, a femtocell search signal to be transmitted over the air may be generated using both PSC information and one frequency belonging to the frequency band or the multiple frequencies.

In the above description, the femtocell search is conducted using a frequency and PSC information, a frequency, and a frequency band or multiple frequencies, in order. However, the present invention is not limited by such order or combination. That is, the order or combination of search parameters may be selectively rearranged according to user selection through a femtocell search menu. For example, according to a user's selection, a femtocell search is conducted first using a frequency band, and, if a femtocell is not found, then femtocell search is newly conducted using multiple frequencies and PSC information.

In summary, the femtocell utilizing method of the present invention may conduct a femtocell search according to terminal settings, on the basis of at least one of a frequency and PSC information, a frequency, a frequency band or multiple frequencies, and a frequency band or multiple frequencies with PSC information. In the embodiment, the femtocell search based on a frequency and PSC information is conducted first, and, if unsuccessful, another femtocell search based on other terms is conducted in sequence. That is, the first mobile terminal 100 utilizing a femtocell conducts a first femtocell search based on a frequency and PSC information; if the search fails, the first mobile terminal 100 conducts another femtocell search based on a frequency; if this search fails, the first mobile terminal 100 conducts another femtocell search based on a frequency band or multiple frequencies with PSC information; and if this search fails, the first mobile terminal 100 conducts another femtocell search based on a frequency band or multiple frequencies. In addition, a femtocell search menu may be provided to permit selection of femtocell search parameters and modification of the search sequence.

In the above description of the femtocell search procedure and apparatus, femtocell search is initiated by selecting a menu item displayed on the display unit 140. However, the present invention is not limited thereto. That is, a short-cut key can be set for initiating the femtocell search in the first mobile terminal 100, and the user may activate the short-cut key to conduct the femtocell search. Here, multiple short-cut keys may be respectively associated with items of the search setting data. For example, a first short-cut key is mapped to initiation of femtocell search based on a frequency and PSC information, a second short-cut key is mapped to initiation of femtocell search based on a frequency, and a third short-cut key is mapped to initiation of femtocell search based on a frequency band.

In addition, when the mobile terminal goes out of the coverage area of a femtocell created by a microminiaturized base station for mobile communication after establishing a communication channel to the femtocell, it may automatically access and establish a communication channel to a base station of a mobile communication network covering the corresponding area. In this case, the mobile terminal may perform a procedure of handover from the femtocell to the mobile communication network.

As apparent from the above description, the present invention provides a femtocell utilizing method and apparatus that enable a mobile terminal to conduct femtocell search at a desired point in time according to the user input and then search setting data. In addition, femtocell search may be conducted in stages or selectively using various search setting data items.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method comprising:
   displaying, by a communication terminal, at least two of a frequency, a Primary Scrambling Code (PSC), and a frequency band;
   detecting, a selection of at least one of the frequency, the PSC, and the frequency band, the selection being received via an input device of the communication terminal;
   conducting by the communication terminal, a first femtocell search based on the received selection, the first femtocell search being a search for a femtocell base station;
   displaying one screen of:
   a screen notifying of an attempt for the first femtocell search, a screen notifying success of the first femtocell search and a screen notifying failure of the first fennocell search based on the conducted first femtocell search; and
   initiating, by the communication terminal, a registration with the femtocell base station, when the first femtocell search is successful.

2. The method of claim 1, further comprising outputting, by the communication terminal, a notification message indicating failure of the first femtocell search, when the first femtocell search is unsuccessful.

3. The method of claim 1, wherein:
   receiving the selection includes receiving a selection of the frequency and the PSC; and
   the first femtocell search is conducted based on the frequency and the PSC.

4. The method of claim 3, further comprising conducting a second femtocell search based on the frequency when the first femtocell search fails.

5. The method of claim 4, further comprising conducting a third femtocell search based on the frequency band or a first plurality of frequencies, when the second femtocell search fails.

6. The method of claim 5, further comprising conducting a fourth femtocell search based on a second plurality of frequencies, when the third femtocell search fails.

7. The method of claim 6, wherein the second plurality of frequencies does not include any of the frequencies in the first plurality.

8. The method of claim 1, further comprising one of:
- establishing, when the registration is successful, a communication channel to the femtocell base station, and providing a notification message indicating successful registration; and
- providing, when the registration is unsuccessful, a notification message indicating registration failure.

9. An apparatus comprising:
- display unit;
- an input unit; and
- a control unit, configured to:
- display, on the display unit, at least two of a frequency, a Primary Scrambling Code (PSC), and a frequency band;
- receive, via the input unit, a selection of at least one of the frequency, the PSC, and the frequency band;
- conduct a first femtocell search based on the received selection, the first femtocell search being a search for a femtocell base station;
- display one screen of:
- a screen notifying of an attempt for the first femtocell search, a screen notifying success of the first femtocell search and a screen notifying failure of the first femtocell search based on the conducted first femtocell search; and
- initiate a registration with the femtocell base station, when the first femtocell search is successful.

10. The apparatus of claim 9, wherein the control unit is further configured to output, a notification message indicating failure of the first femtocell search, when the first femtocell search is unsuccessful.

11. The apparatus of claim 9, wherein:
- receiving the selection includes receiving a selection of the frequency and the PSC; and
- the first femtocell search is conducted based on the frequency and the PSC.

12. The apparatus of claim 11, wherein the control unit is further configured to conduct a second femtocell search based on the frequency when the first femtocell search fails.

13. The apparatus of claim 12, wherein the control unit is further configured to conduct a third femtocell search based on the frequency band or a first plurality of frequencies, when the second femtocell search fails.

14. The apparatus of claim 13, wherein the control unit is further configured to conduct a fourth femtocell search based on a second plurality of frequencies, when the third femtocell search fails.

15. The apparatus of claim 9, wherein the control unit is further configured to:
- establish, when the registration is successful, a communication channel to the femtocell base station, and providing a notification message indicating successful registration; and
- provide, when the registration is unsuccessful, a notification message indicating registration failure.

* * * * *

UNITED STATES PATENT AND TRADEMARK OFFICE
CERTIFICATE OF CORRECTION

| | | |
|---|---|---|
| PATENT NO. | : 8,897,773 B2 | Page 1 of 1 |
| APPLICATION NO. | : 12/855890 | |
| DATED | : November 25, 2014 | |
| INVENTOR(S) | : Chun | |

It is certified that error appears in the above-identified patent and that said Letters Patent is hereby corrected as shown below:

In the Claims

Column 10, Lines 43-44, Claim 1, delete "the first fennocell search" and insert --...the first femtocell search...--

Signed and Sealed this
Third Day of March, 2015

Michelle K. Lee
*Deputy Director of the United States Patent and Trademark Office*